United States Patent
Choi

(10) Patent No.: US 6,980,266 B2
(45) Date of Patent: Dec. 27, 2005

(54) LIQUID CRYSTAL DISPLAY AND DRIVING METHOD THEREOF

(75) Inventor: Sang Ho Choi, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 46 days.

(21) Appl. No.: 10/745,542

(22) Filed: Dec. 29, 2003

(65) Prior Publication Data

US 2004/0135938 A1 Jul. 15, 2004

(30) Foreign Application Priority Data

Dec. 30, 2002 (KR) ........................ 10-2002-0087090

(51) Int. Cl.$^7$ ........................ G02F 1/133; G02F 1/1335

(52) U.S. Cl. ........................ 349/106; 349/73; 345/88

(58) Field of Search ........................ 349/73, 106; 345/88

(56) References Cited

U.S. PATENT DOCUMENTS

| | | | | |
|---|---|---|---|---|
| 4,825,203 A | * | 4/1989 | Takeda et al. | 345/88 |
| 4,920,409 A | * | 4/1990 | Yamagishi | 348/791 |
| 5,519,521 A | * | 5/1996 | Okimoto et al. | 349/42 |

* cited by examiner

*Primary Examiner*—Huyen Ngo
(74) *Attorney, Agent, or Firm*—McKenna Long & Aldridge LLP

(57) ABSTRACT

A liquid crystal display device and method that are adaptive to compensate for brightness deviation among red, green and blue colors. This device includes red liquid crystal cell lines having red liquid crystal cells, green liquid crystal cell lines having green liquid crystal cells, and blue liquid crystal cell lines having blue liquid crystal cells. Common electrodes are formed for each red, green and blue liquid crystal line. A common electrode of at least one liquid crystal cell line of the red, green and blue liquid crystal cell lines is supplied with a different common voltage that is a reference voltage to drive the liquid crystal cells.

10 Claims, 10 Drawing Sheets

LIQUID CRYSTAL DISPLAY AND DRIVING METHOD THEREOF

This application claims the benefit of Korean Patent Application No. P2002-87090 filed on Dec. 30, 2002, which is hereby incorporated by reference for all purposes as if fully set forth herein.

BACKGROUND OF THE INVENTION

1. Field of the Invention

This invention relates to a liquid crystal display. More particularly, the invention relates to a liquid crystal display and a driving method thereof that are adaptive to compensate for a brightness deviation among red, green and blue colors.

2. Discussion of the Related Art

Generally, a liquid crystal display (LCD) controls light transmittance of a liquid crystal having a dielectric anisotropy using an electric field to display a picture. To this end, the LCD includes a liquid crystal display panel having a pixel matrix, and a driving circuit for driving the liquid crystal display panel.

Specifically, as shown in FIG. 1, the LCD includes a liquid crystal display panel 2 having a pixel matrix, a gate driver 4 for driving gate lines GL0 to GLn of the liquid crystal display panel 2, a data driver 6 for driving data lines DL1 to DLm of the liquid crystal display panel 2, and a timing controller 8 for controlling driver timing of the gate driver 4 and the data driver 6.

The liquid crystal display panel 2 includes a pixel matrix consisting of sub-pixels 10 defined by crossings of the gate lines GL and the data lines DL. Each of the sub-pixels 10 includes a liquid crystal cell Clc for controlling a light transmission amount in accordance with a pixel signal, and a thin film transistor TFT for driving the liquid crystal cell Clc.

The thin film transistor TFT is turned on when a scanning signal, that is, a gate high voltage VGH from the gate line GL, is applied to provide a pixel signal from the data line DL to the liquid crystal cell Clc. Further, the thin film transistor TFT is turned off when a gate low voltage VGL from the gate line GL is applied, and a pixel signal is charged in the liquid crystal cell Clc.

The liquid crystal cell Clc can be expressed equivalently as a capacitor, and consists of a common electrode opposite a pixel electrode having a liquid crystal therebetween connected to the thin film transistor TFT. The liquid crystal cell Clc further includes a storage capacitor Cst that stores the charged pixel signal until a next pixel signal is charged. The liquid crystal cell Clc changes an alignment state of the liquid crystal having a dielectric anisotropy in accordance with the pixel signal charged through the thin film transistor TFT.

The gate driver 4 shifts a gate start pulse GSP from the timing controller 8 in response to a gate shift clock GSC to thereby sequentially apply a scanning pulse having the gate high voltage VGH to the gate lines GL1 to GLm. The gate driver 4 also supplies a gate low voltage VGL to the gate lines GL in the remaining interval at which a scanning pulse having the gate high voltage VGH is not applied. Further, the gate driver 4 controls a pulse width of the scanning pulse in response to a gate output enable signal GOE from the timing controller 8. Such a gate driver 4 includes a plurality of gate driving integrated circuits (IC's) to permit selective driving of the gate lines GL0 to GLn.

The data driver 6 shifts a source start pulse SSP from the timing controller 8 in response to a source shift clock SSC to generate a sampling signal. Further, the data driver 6 latches pixel data RGB input in accordance with the source shift clock SSC in response to the sampling signal and thereafter supplies the latched sampling signal line by line in response to a source output enable signal SOE. Then, the data driver 6 converts the pixel data RGB supplied line by line to analog pixel signals in response to a gamma voltage from a gamma voltage source (not shown) to apply them to the data lines DL1 to DLm. Herein, the data driver 6 determines a polarity of the pixel signal in response to a polarity control signal POL from the timing controller 8 when the pixel data is converted to the pixel signals. Further, the data driver 6 determines a period when the pixel signals are applied to the data lines DL1 to DLm in response to said SOE signal. The data driver 6 includes a plurality of data driving integrated circuits (IC's) for separately driving the data lines DL1 to DLm.

The timing controller 8 generates GSP, GSC, GOE signals, etc. to control the gate driver 4, and SSP, SSC, SOE and POL signals, etc. to control the data driver 6. The timing controller 8 generates control signals such as GSP, GSC, GOE, SSP, SSC, SOE and POL, etc. using a data enable signal DE for informing an effective data interval input from the exterior, a horizontal synchronizing signal Hsync, a vertical synchronizing signal Vsync and a dot clock DCLK for determining a transmission timing of the pixel data RGB.

The related art liquid crystal display device has a red (R) color filter, a green (G) color filter and a blue (B) color filter for each sub-pixel on the upper substrate of the liquid crystal display panel 2, as shown in FIG. 2. Generally, a combination of three sub-pixels 10 provided with such R, G and B color filters used to provide color for one pixel. The R, G and B color filters are formed for each cell area, that is, for each sub-pixel area defined by a black matrix having a matrix type. A common electrode 20 is entirely coated onto the upper substrate having the R, G and B color filters to apply to a common voltage Vcom to the liquid crystal cell Clc. The common voltage Vcom applied to the common electrode 20 keeps a constant direct current voltage as shown in FIG. 3. Further, a pixel signal D, alternating a positive(+) polarity and a negative(−) polarity on the basis of the common voltage Vcom as shown in FIG. 3, is applied, via the data line DL and the thin film transistor TFT, to the liquid crystal cell Clc.

However, in the related art liquid crystal display device, because the R, G and B color filters have a different transmission characteristic, transmittance (T) curves of the R, G and B lights related to a supply voltage V have a different shape as shown in FIG. 4A and FIG. 4B. FIG. 4A and FIG. 4B show transmittance (T) curves of R, G and B lights related to a supply voltage V at each of the R, G and B liquid crystal cells using a liquid crystal having an optically compensated bend (OCB) mode. Herein, a 650 nm waveform means an R light; a 550 nm does a G light; and a 450 nm does a B light. Referring to FIG. 4A and FIG. 4B, it can be seen that, as light transmittances at the R, G and B liquid crystal cells are different from each other, supply voltages V corresponding to minimum brightness of the R, G and B lights at a black level are different from each other. More specifically, as can be seen from FIG. 4B, a supply voltage V corresponding to a minimum brightness of the B light is smaller than 4V, whereas a supply voltage V corresponding to a minimum brightness of the G or R light is larger than 4V. Accordingly, since a brightness of the B light becomes relatively high when supply voltages V corresponding to minimum brightness of the G and B lights are determined by a black level voltage, a color shift phenomenon causing a rise of the black level occurs. Because such a color shift phenomenon reduces a contrast ratio, sharpness of a picture displayed on the liquid crystal display device is deteriorated.

SUMMARY OF THE INVENTION

Accordingly, the present invention is directed to a liquid crystal display and driving method thereof that substantially obviate one or more of the problems due to limitations and disadvantages of the related art.

An advantage of the present invention is to provide a liquid crystal display and a driving method thereof that are adaptive to compensate brightness deviation among red, green and blue liquid crystal cells with respect to the same brightness level.

In order to achieve this and other advantages of the invention, a liquid crystal display device according to one aspect of the present invention includes red liquid crystal cell lines consisting of red liquid crystal cells; green liquid crystal cell lines consisting of green liquid crystal cells; blue liquid crystal cell lines consisting of blue liquid crystal cells; and common electrodes formed separately for each red, green and blue liquid crystal line, wherein a common electrode of at least one liquid crystal cell line of the red, green and blue liquid crystal cell lines is supplied with a different common voltage, the common voltage being a reference voltage upon driving of the liquid crystal cells.

In an embodiment of the liquid crystal display device, the common electrode of the red liquid crystal cell line and the common electrode of the green liquid crystal cell line are supplied with a first common voltage while the common electrode of the blue liquid crystal cell line is supplied with a second common voltage different from the first common voltage.

Each of the red, green and blue liquid crystal cell lines may be supplied with a different common voltage.

For example, the common electrode line of the red liquid crystal cell line may be supplied with a red common voltage; the common electrode line of the green liquid crystal cell line may be supplied with a green common voltage different from said red common voltage by a first difference voltage; and the common electrode line of the blue liquid crystal cell line may be supplied with a blue common voltage different from said red common voltage by a second difference voltage.

Herein, an absolute value of the first difference voltage is larger than that of the second difference voltage.

Any one of the red, green and blue common voltages is a direct current voltage, and common voltages other than the direct current voltage are alternating current voltages. The polarities of the alternating current voltages are inverted on a basis of the direct current voltage in accordance with polarities of pixel signals applied to the corresponding liquid crystal cells.

When the red, green and blue liquid crystal cells arranged in the horizontal direction are charged with pixel signals having the same polarity, the red common voltage is commonly applied to common electrode lines of the red liquid crystal cell line; the green common voltage is commonly applied to the common electrode lines of the green liquid crystal cell line; and the blue common voltage is commonly applied to the common electrode lines of the blue liquid crystal cell line.

Alternatively, when the red, green and blue liquid crystal cells arranged in the horizontal direction are charged with pixel signals having a different polarity, the common electrode lines of the red liquid crystal cell line are divided into at least two groups supplied with first and second red common voltages; the common electrode lines of the green liquid crystal cell line is divided into at least two groups supplied with first and second green common voltages; and the common electrode lines of the blue liquid crystal cell line are divided into at least two groups supplied with first and second blue common voltages.

The first and second red common voltages have the same absolute value and an opposite polarity; the first and second green common voltages have the same absolute value and an opposite polarity; and the first and second blue common voltages have the same absolute value and an opposite polarity.

First and second common voltages for any one of the red, green and blue colors are the same direct current voltage, and the first and second voltages for the remaining one thereof have the same absolute value and an opposite polarity.

A method of driving a liquid crystal display according to another aspect of the present invention, including red liquid crystal cell lines consisting of red liquid crystal cells, green liquid crystal cell lines consisting of green liquid crystal cells and blue liquid crystal cell lines consisting of blue liquid crystal cells, wherein a common electrode of at least one liquid crystal cell line, of the red, green and blue liquid crystal cell lines, is supplied, via common electrode lines formed separately for each red, green and blue column line, with a different common voltage, the common voltage being a reference voltage upon driving of the liquid crystal cells.

In the method, the common electrode of the red liquid crystal cell line and the common electrode of the green liquid crystal cell line are supplied with a first common voltage while the common electrode of the blue liquid crystal cell line is supplied with a second common voltage.

Each of the red, green and blue liquid crystal cell lines may be supplied with a different common voltage.

Herein, the common electrode line of the red liquid crystal cell line is supplied with a red common voltage; the common electrode line of the green liquid crystal cell line is supplied with a green common voltage different from the red common voltage by a first difference voltage; and the common electrode line of the blue liquid crystal cell line is supplied with a blue common voltage different from the red common voltage by a second difference voltage.

An absolute value of the first difference voltage is larger than that of the second difference voltage.

Any one of said red, green and blue common voltages is a direct current voltage, and common voltages other than the direct current voltages are alternating current voltages, polarities of the alternating current voltages are inverted on a basis of the direct current voltage in accordance with polarities of pixel signals applied to the corresponding liquid crystal cells.

When the red, green and blue liquid crystal cells arranged in the horizontal direction are charged with pixel signals having the same polarity, the red common voltage is commonly applied to common electrode lines of the red liquid crystal cell line; the green common voltage is commonly applied to the common electrode lines of the green liquid crystal cell line; and the blue common voltage is commonly applied to the common electrode lines of the blue liquid crystal cell line.

Alternatively, when the red, green and blue liquid crystal cells arranged in the horizontal direction are charged with pixel signals having a different polarity, the common electrode lines of the red liquid crystal cell line are divided into at least two groups supplied with first and second red common voltages; the common electrode lines of the green liquid crystal cell line are divided into at least two groups supplied with first and second green common voltages; and the common electrode lines of the blue liquid crystal cell line are divided into at least two groups supplied with first and second blue common voltages.

Herein, the first and second red common voltages have the same absolute value and an opposite polarity; the first and second green common voltages have the same absolute value and an opposite polarity; and the first and second blue common voltages have the same absolute value and an opposite polarity.

First and second common voltages for any one of the red, green and blue colors are the same direct current voltage, and the first and second voltages for the remaining color have the same absolute value and an opposite polarity.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 5:
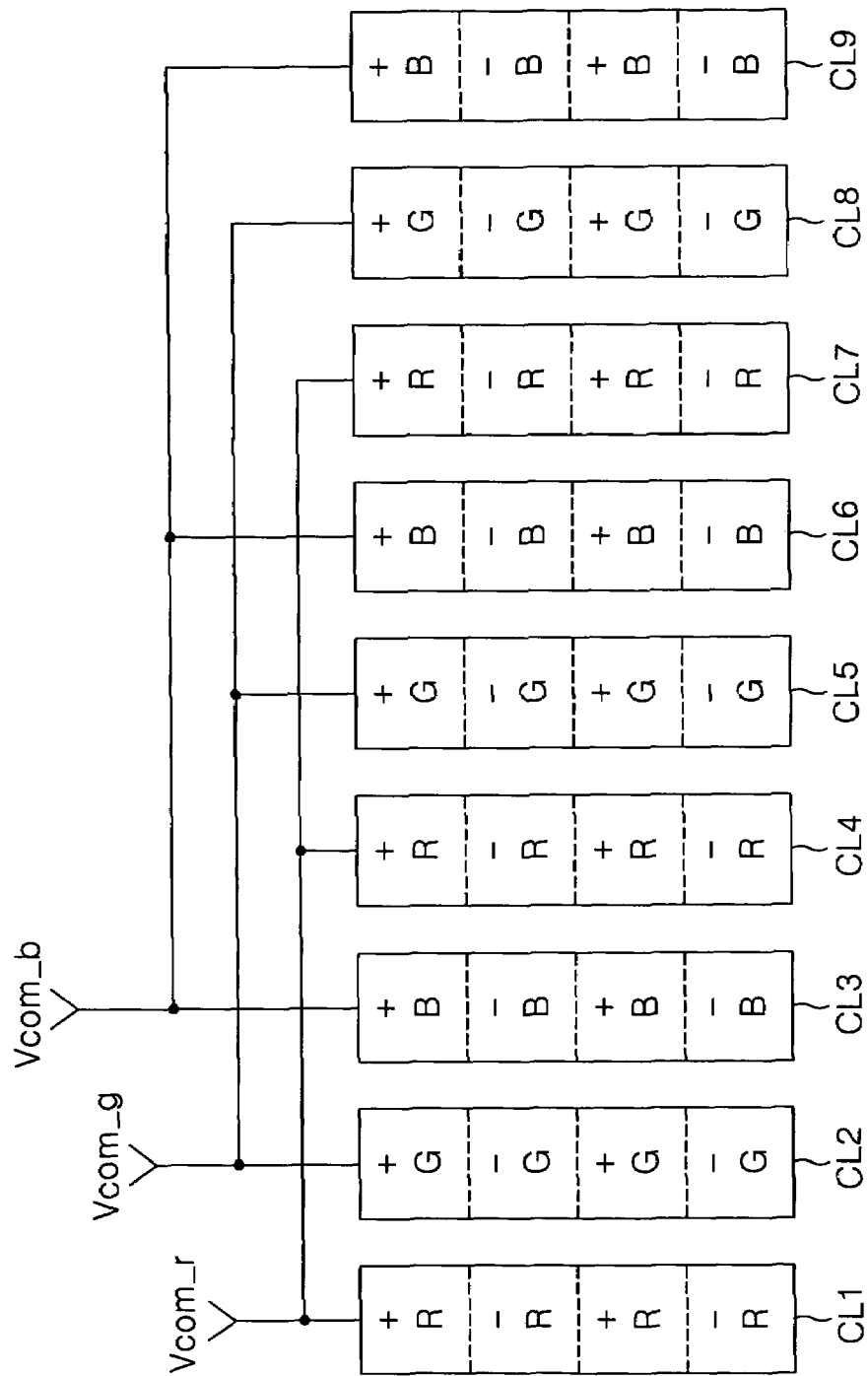
FIG. 5 is a plan view showing a common electrode structure of a liquid crystal display according to a first embodiment of the present invention.

FIG. 5 shows a common electrode structure included in a liquid crystal display according to a first embodiment of the present invention.

Referring to FIG. 5, the liquid crystal display according to the first embodiment includes common electrode lines CL1, CL2, CL3, . . . formed separately for each liquid crystal cell line in a vertical direction, that is, for each column line.

Figure 1:
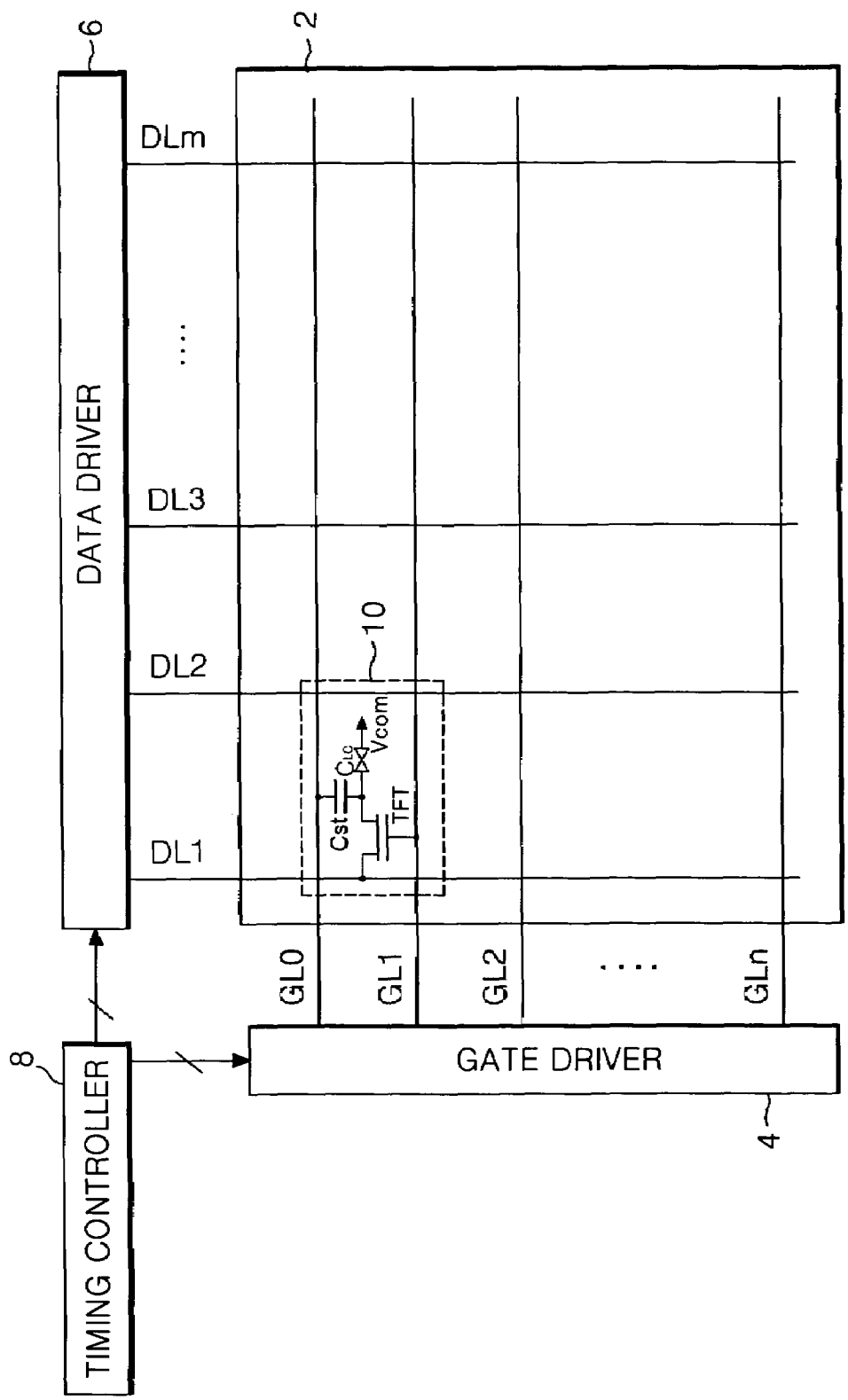
FIG. 1 is a schematic block view showing a configuration of a related art liquid crystal display.
Figure 2:
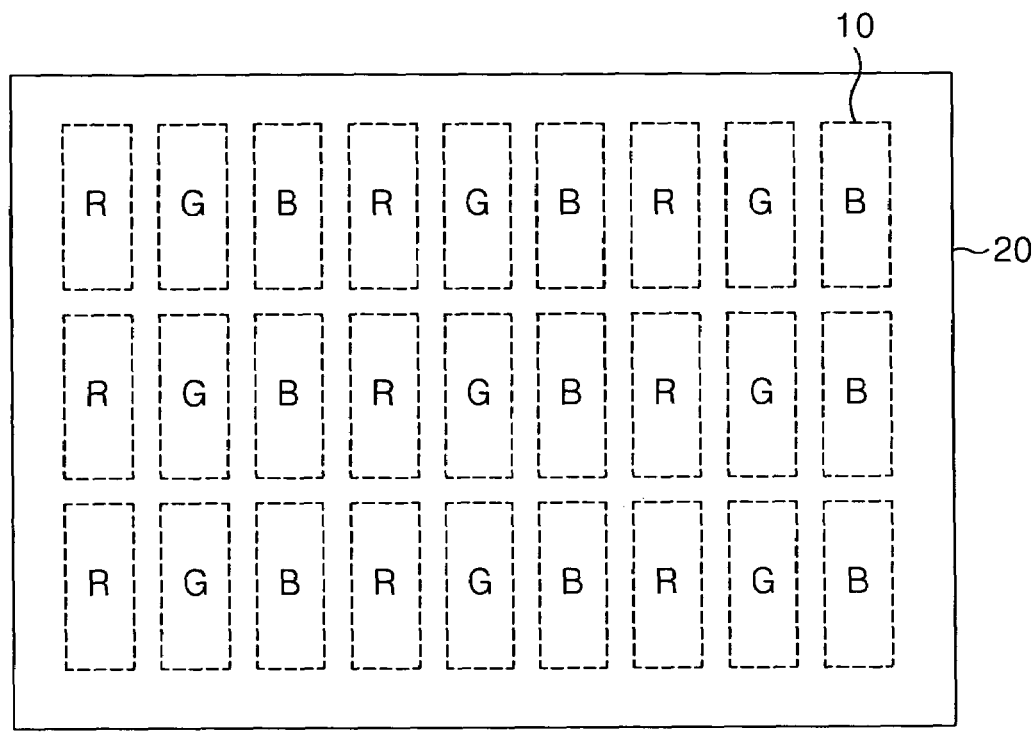
FIG. 2 is a plan view showing a common electrode structure formed on the liquid crystal display panel in FIG. 1.
Figure 3:
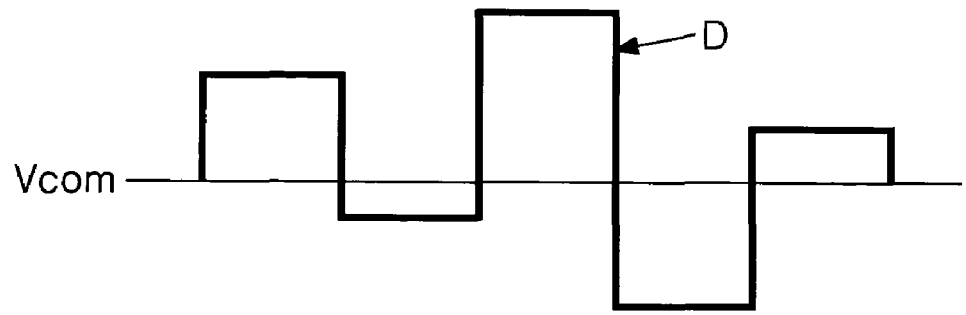
FIG. 3 is a waveform diagram showing a relationship of a related art pixel signal to a common voltage.

As shown in FIG. 1, a liquid crystal display includes a liquid crystal display panel 2 having a pixel matrix, a gate driver 4 for sequentially driving gate lines GL0 to GLn of the liquid crystal display panel 2, a data driver 6 for driving data lines DL1 to DLm of the liquid crystal display panel 2, and a timing controller 8 for controlling driving timings of the gate driver 4 and the data driver 6.

The liquid crystal display panel 2 includes a pixel matrix consisting of sub-pixels 10 defined by crossings between the gate lines GL and the data lines DL. Each of the sub-pixels 10 includes a liquid crystal cell Clc for controlling a light transmission amount in accordance with a pixel signal, and a thin film transistor TFT for driving the liquid crystal cell Clc. The liquid crystal display panel 2 is provided with a red (R) color filter, a green (G) color filter and a blue (B) color filter for each sub-pixel 10. A combination of three sub-pixels 10 provided with such R, G and B color filters provides color for one pixel. Further to FIG. 1, the R, G and B color filters have colors arranged in a divisional manner for each column as shown in FIG. 5. Thus, the liquid crystal display panel 2 has a structure in which red (R) column lines consisting of R sub-pixels, green (G) column lines consisting of G sub-pixels and blue (B) column lines consisting of B sub-pixels are alternately arranged.

Particularly, the common electrode lines CL1, CL2, CL3, applying a common voltage Vcom to the liquid crystal cell Clc are formed by patterning each column line. An independent common voltage is applied to each R, G and B column line via the common electrode lines CL1, CL2, CL3, patterned for each column line. To this end, a common voltage generator (not shown) generates different R, G and B common voltages Vcom_r, Vcom_g and Vcom_b. Accordingly, different R, G and B common voltages Vcom_r, Vcom_g and Vcom_b are applied for each R, G and B column line, so that it is possible to compensate a brightness deviation for the R, G and B liquid crystal cells.

Figure 6:
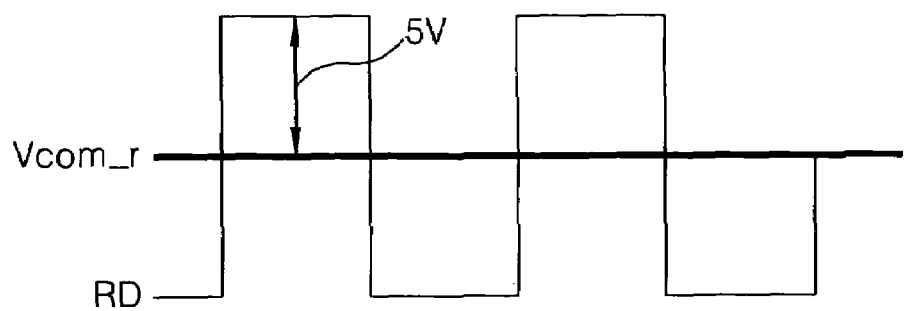
FIG. 6 is a waveform diagram showing a relationship of pixel signals to common voltages applied to the common electrodes in FIG. 5.
Figure 6:
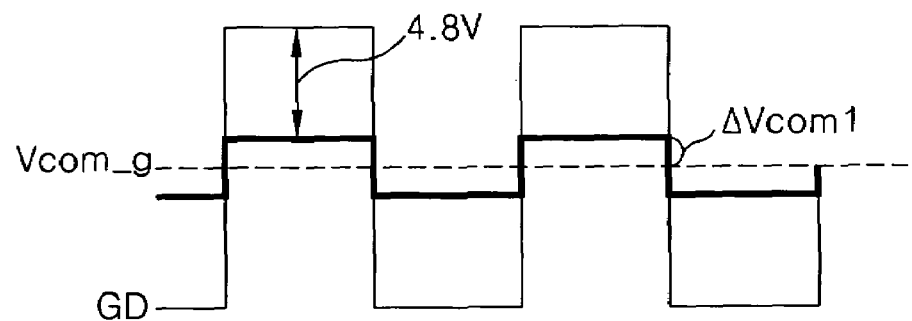
Figure 6:
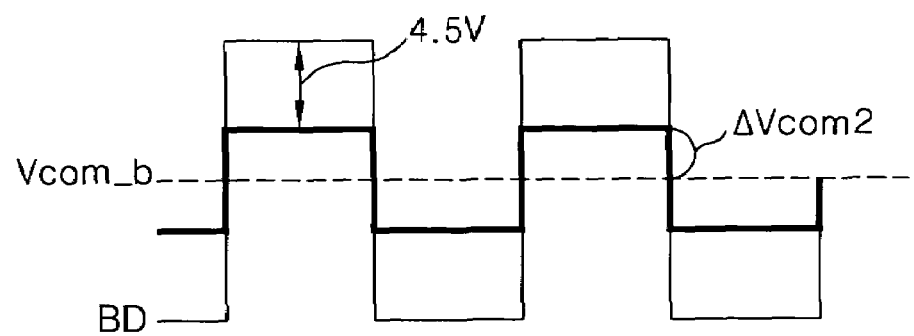

For instance, the common electrode lines CL1, CL4, CL7, in the R column lines are supplied with the R common voltage Vcom_r as shown in FIG. 6. The common electrode lines CL2, CL5, CL8, in the G column line are supplied with a G common voltage Vcom_g higher or lower than the R common voltage Vcom_r by a first difference voltage ΔVcom1. Further, the common electrode lines CL3, CL6, CL9, in the B column line are supplied with a B common voltage Vcom_b higher or lower than the R common voltage Vcom_r by a second difference voltage ΔVcom2. An absolute value of the second difference voltage ΔVcom2 is larger than that of the first difference voltage ΔVcom1. A direct current voltage as shown in FIG. 6 is applied as the R common voltage Vcom_r, whereas an alternating current voltage having a repeating positive(+) polarity and a negative(−) polarity based upon the R common voltage Vcom_r in accordance with polarities of the pixel signals GD and BD applied to the liquid crystal cell as shown in FIG. 6 is applied as the G and B common voltages Vcom_g and Vcom_b.

Since such R, G and B common voltages Vcom_r, Vcom_g and Vcom_b aim to compensate for voltages of the R, G and B liquid crystal cells corresponding to a minimum brightness which become smaller in their turn (i.e., R>G>B), absolute values of the R, G and B common voltages are set to have a larger value in turn as shown in FIG. 6 (i.e., |Vcom_r|<|Vcom_g|<|Vcom_b|). Thus, the R, G and B common voltages Vcom_r, Vcom_g and Vcom_b are set differently from each other to compensate for a voltage deviation of the R, G and B liquid crystal cells corresponding to a minimum brightness. Thus, it is possible to compensate for a brightness deviation for the same brightness among the R, G and B liquid crystal cells.

When the liquid crystal display panel is driven in a line inversion system in which a polarity is inverted for each horizontal line as shown in FIG. 5, the R, G and B liquid crystal cells in the horizontal direction are charged with pixel signals having the same polarity. Thus, the common electrode lines CL1, CL2, CL3, . . . , arranged in parallel, in the horizontal direction can be supplied with a common voltage having the same polarity. In other words, the common electrode lines CL1, CL4, CL7, . . . formed in the R column lines are commonly supplied with a R common voltage Vcom_r; the common electrode lines CL2, CL5, CL8, . . . formed in the G column lines are commonly supplied with a G common voltage Vcom_g; and the common electrode lines CL3, CL6, CL9 formed in the B column lines are commonly supplied with a B common voltage Vcom_b.

For example, the R, G and B column lines, arranged in parallel, in the horizontal direction are supplied with pixel signals RD, GD and BD and the common voltages Vcom_r, Vcom_g and Vcom_b as shown in FIG. 6. Referring to FIG. 6, the R column line is supplied with the R common voltage Vcom_r along with a pixel signal RD which alternates with a positive(+) polarity and a negative(−) polarity on the basis of the R common voltage Vcom_r for each horizontal period. The G column line is supplied with the G common voltage Vcom_g and a pixel signal GD which alternates with a positive(+) polarity and a negative(−) polarity on the basis of the R common voltage Vcom_r for each horizontal period. The B column line is supplied with the B common voltage Vcom_b and a pixel signal BD which alternates with a positive(+) polarity and a negative (−) polarity on the basis of the R common voltage Vcom_r for each horizontal period. Herein, when pixel signals RD, GD and BD, having a voltage of 5V corresponding to a minimum level brightness, are applied to the R, G and B column lines, different common voltages Vcom_r, Vcom_g and Vcom_b permit a driving voltage of 5V to be applied to the R liquid crystal cell; a driving voltage of 4.8V to be applied to the G liquid crystal cell; and a driving voltage of 4.5V to be applied to the B liquid crystal cell. In other words, when a pixel signal having the same voltage V corresponding to a minimum level brightness is applied to each of the R, G and B liquid crystal cells, different common voltages Vcom_r, Vcom_g and Vcom_b permit a different voltage, corresponding to a minimum brightness, to be loaded on each R, G and B liquid crystal cell. Accordingly, the R, G and B liquid crystal cells can have an identical minimum brightness. As a result, the liquid crystal display can prevent a brightness deviation among the R, G and B liquid crystal cells in correspondence with the same brightness level of the pixel signal.

Alternatively, the R and G common voltages Vcom_r and Vcom_g may be set equally and the B common voltage Vcom_b may be set differently, to thereby compensate for the B liquid crystal cell having a larger brightness deviation than the R liquid crystal cell or the G liquid crystal cell.

Figure 8:
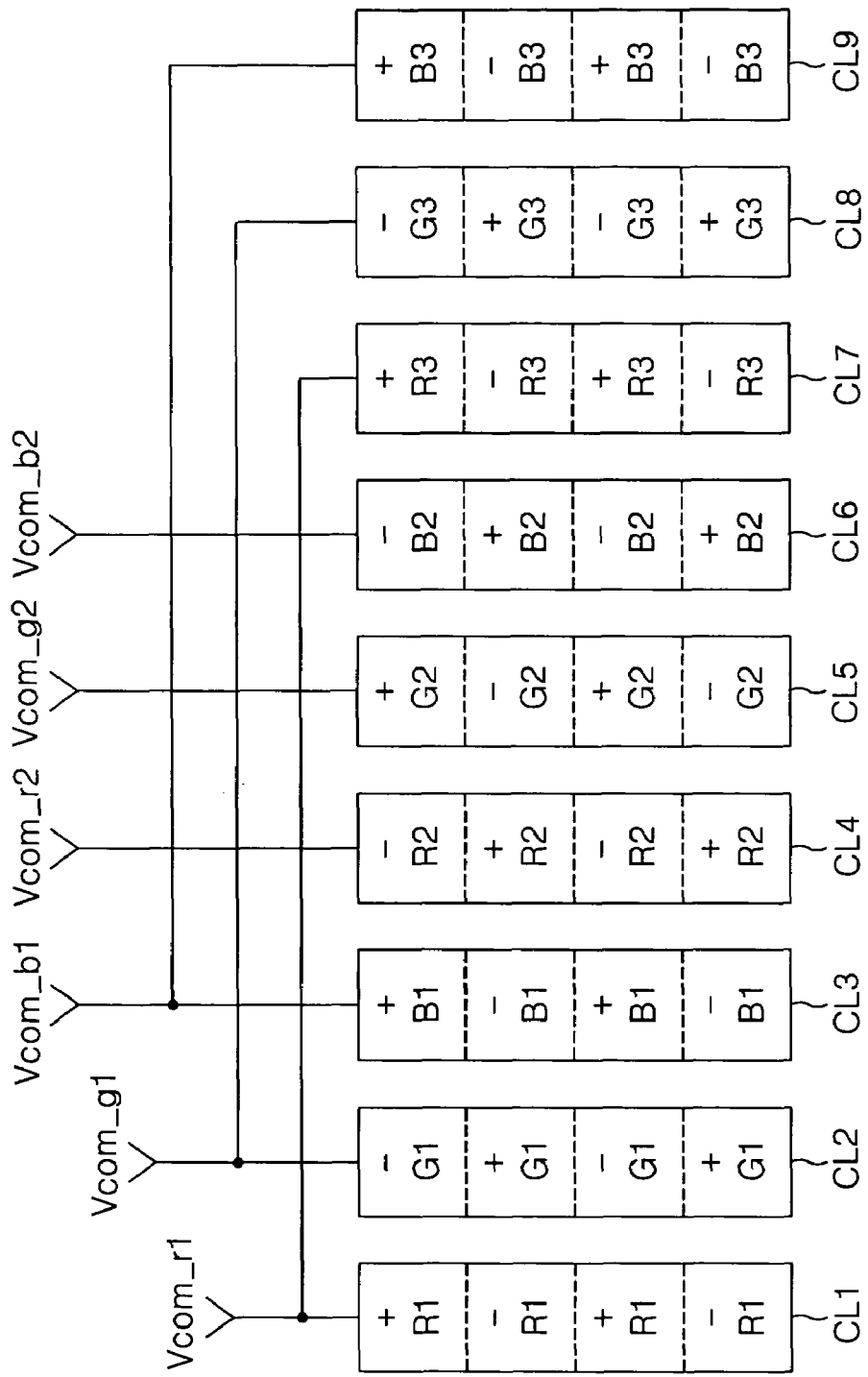
FIG. 8 is a plan view showing a common electrode structure of a liquid crystal display according to a second embodiment of the present invention.

FIG. 8 shows a common electrode structure included in a liquid crystal display according to a second embodiment of the present invention.

In FIG. 8, common electrode lines CL1, CL2, CL3, applying a common voltage Vcom to a liquid crystal cell Clc are formed by patterning each column line. An independent common voltage is applied to each R, G and B column line via the common electrode lines CL1, CL2, CL3. Particularly, when the liquid crystal display panel is driven in a dot inversion system, R, G and B liquid crystal cells arranged in the horizontal direction are charged with pixel signals having a polarity different from adjacent liquid crystal cells. Thus, the common electrode lines CL1, CL2, CL3, . . . arranged in parallel in the horizontal direction should be supplied with common voltages having a polarity different from adjacent common electrode lines CL.

To this end, a common voltage generator (not shown) generates first and second R common voltages Vcom_r1 and Vcom_r2 having an opposite polarity, first and second G common voltages Vcom_g1 and Vcom_g2 having an opposite polarity, and first and second B common voltages Vcom_b1 and Vcom_b2 having an opposite polarity. Herein, a direct current voltage, which is a reference voltage, is applied as the first and second R common voltages Vcom_r1 and Vcom_r2 as shown in FIG. 9, the first and second R common voltages Vcom_r1 and Vcom_r2 are set to have the same voltage value.

Accordingly, the common electrode lines CL1, CL4, . . . in the R column lines are supplied with first and second R common voltages Vcom_r1 and Vcom_r2 having an opposite polarity, which are applied when divided into two groups. Herein, the first and second R common voltages Vcom_r1 and Vcom_r2 are set to be the same direct current voltage when they are reference voltages as shown in FIG. 9. The common electrode lines CL2, CL5, . . . in the G column lines are supplied with first and second common voltages Vcom_g1 and Vcom_g2 having an opposite polarity and divided into two groups, and also the common electrode lines CL3, CL6, . . . in the B column line are supplied with first and second common voltages Vcom_b1 and Vcom_b2 having an opposite polarity and divided into two groups. Accordingly, different R, G and B common voltages Vcom_r, Vcom_g and Vcom_b are applied to each R, G and B column line, so that it becomes possible to compensate for brightness deviation for the same minimum brightness value among the R, G and B liquid crystal cells.

Figure 9:
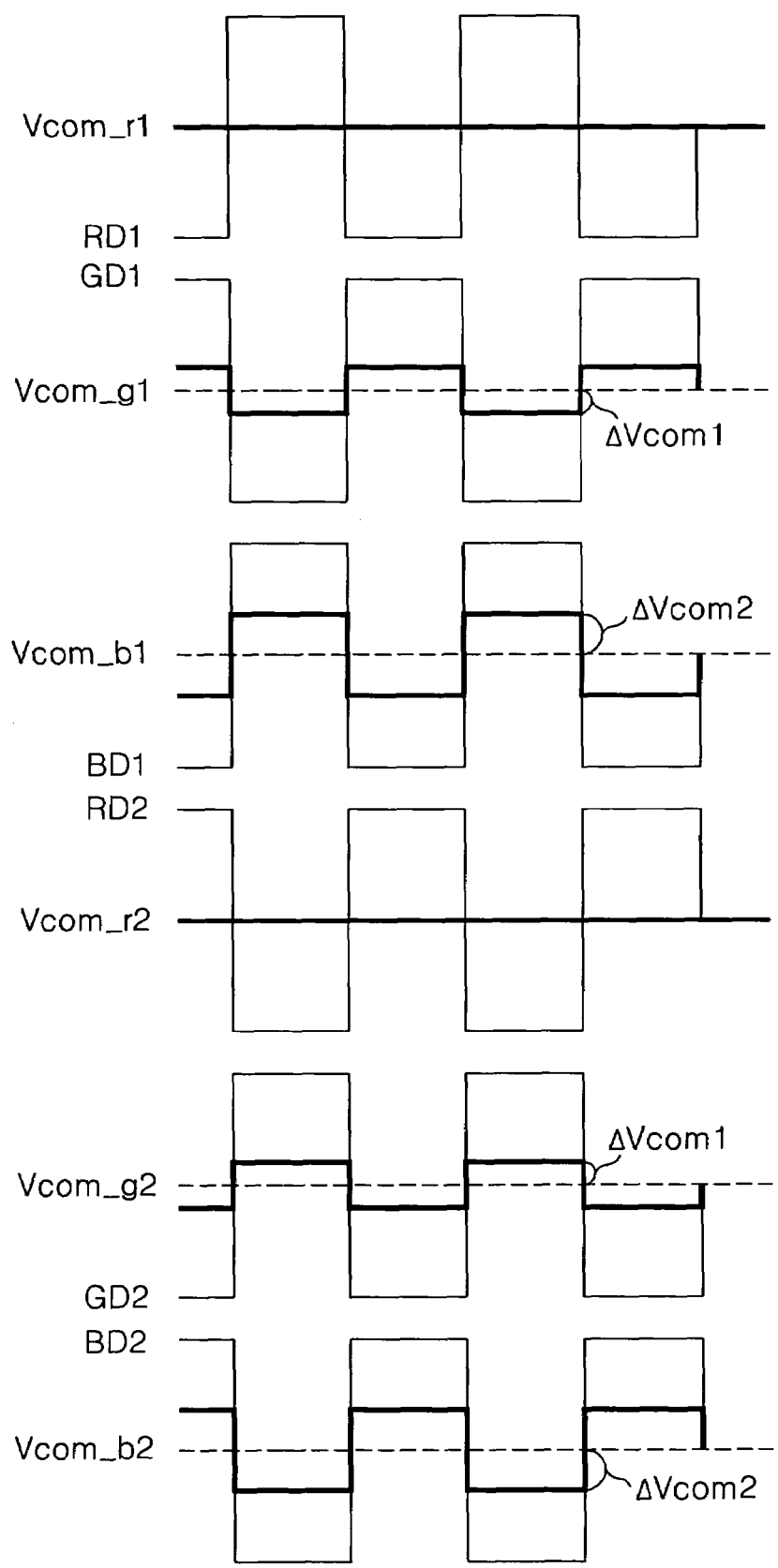
FIG. 9 is a waveform diagram showing a relationship of pixel signals to common voltages applied to the common electrodes in FIG. 8.

For instance, the common electrode lines CL1, CL4, . . . in the R column lines are supplied with the first and second R common voltages Vcom_r1 and Vcom_r2 which are the same direct current voltage as shown in FIG. 9. The common electrode lines CL2, CL5, . . . in the G column lines are supplied with a first and second G common voltages Vcom_g1 and Vcom_g2 higher or lower than the R common voltages Vcom_r1 and Vcom_r2 by a first difference voltage ΔVcom1, respectively. Further, the common electrode lines CL3, CL6, . . . in the B column lines are supplied with a first and second B common voltages Vcom_b1 and Vcom_b2 higher or lower than the R common voltages Vcom_r1 and Vcom_r2 by a second difference voltage ΔVcom2, respectively. Herein, an absolute value of the second difference voltage ΔVcom2 is larger than that of the first difference voltage ΔVcom1.

Figure 4A:
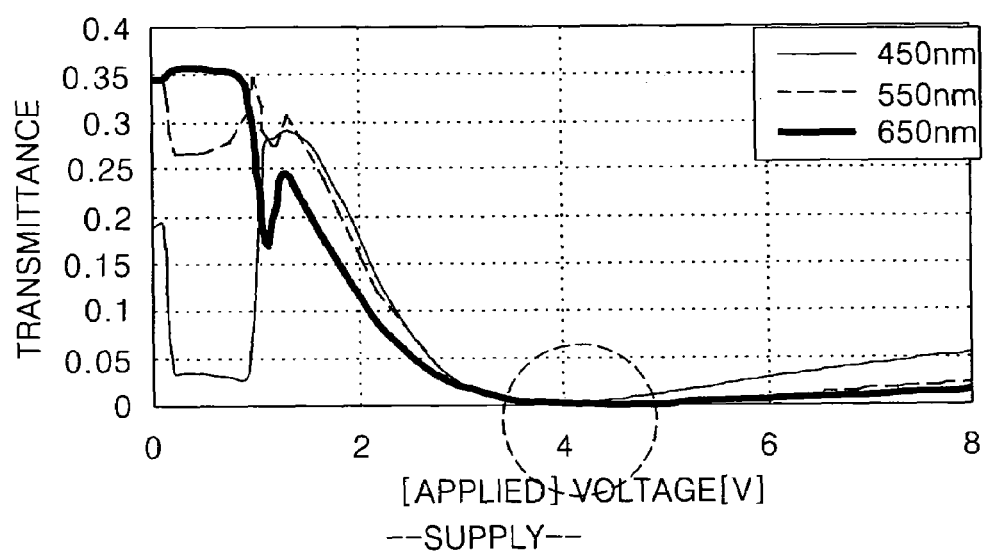
FIG. 4A and FIG. 4B are graphs representing a relationship of transmittance (T) to a supply voltage V for each red, green and blue color.
Figure 4B:
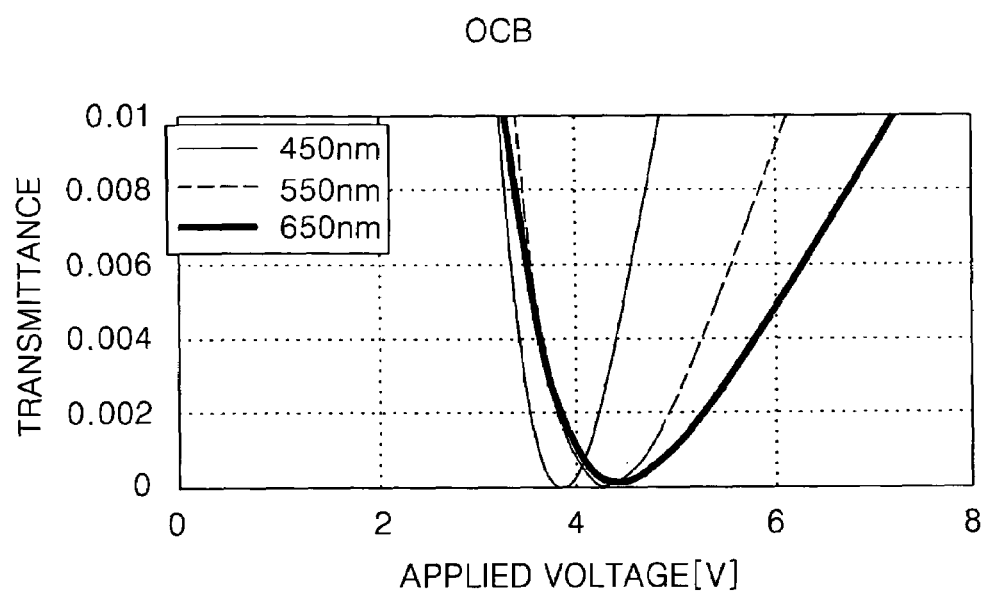

Because R, G and B common voltages Vcom_r, Vcom_g and Vcom_b aim to compensate for voltages of the R, G and B liquid crystal cells corresponding to a minimum brightness which become smaller in their turn (i.e., R>G>B) as shown in FIG. 4B, absolute values of the R, G and B common voltages are set to have a larger value in turn as shown in FIG. 9 (i.e., |Vcom_r|<|Vcom_g|<|Vcom_b|). Thus, the R, G and B common voltages Vcom_r1, Vcom_r2, Vcom_g1, Vcom_g2, Vcom_b1 and Vcom_b2 are set differently from each other to compensate for a voltage deviation of the R, G and B liquid crystal cells corresponding to a minimum brightness value, so that it is possible to compensate for a brightness deviation among the R, G and B liquid crystal cells.

For instance, as shown in FIG. 8, the R1 and R2 column lines are supplied with the first and second R common voltages Vcom_r1 and Vcom_r2 along with pixel signals RD1 and RD2 which alternate a positive(+) polarity and a negative(−) polarity on the basis of the R common voltages Vcom_r1 and Vcom_r2 for each horizontal period. In order to have a dot inversion driving, the pixel signal RD1 applied to the R1 column line and the pixel signal RD2 applied to the R2 column line have a polarity different from each other.

The G1 column line is supplied with a first G common voltage Vcom_g1 and a pixel signal GD1 which alternates a positive(+) polarity and a negative(−) polarity on the basis of the R common voltage Vcom_r for each horizontal period. On the other hand, the G2 column line is supplied with a second G common voltage Vcom_g2 and the pixel signal GD2 which has polarities opposite to the first common voltage Vcom_g1 and the pixel signal GD1, respectively. In this case, in order to have dot inversion driving, the pixel signals GD1 and GD2 applied to the G1 and G2 column lines have polarities opposite to the pixel signals RD1 and RD2 applied to the R1 and R2 column lines, respectively.

Further, the B1 column line is supplied with a first B common voltage Vcom_b1 and a pixel signal BD1 which alternates a positive(+) polarity and a negative(−) polarity on the basis of the R common voltage Vcom_r for each horizontal period. On the other hand, the B2 column line is supplied with a second B common voltage Vcom_b2 and a pixel signal BD2 which have polarities opposite to the first B common voltage Vcom_b1 and the pixel signal BD1, respectively. In this case, in order to have dot inversion driving, the pixel signals BD1 and BD2 applied to the B1 and B2 column lines have polarities opposite to the pixel signals GD1 and GD2 applied to the G1 and G2 column lines, respectively.

Figure 7:
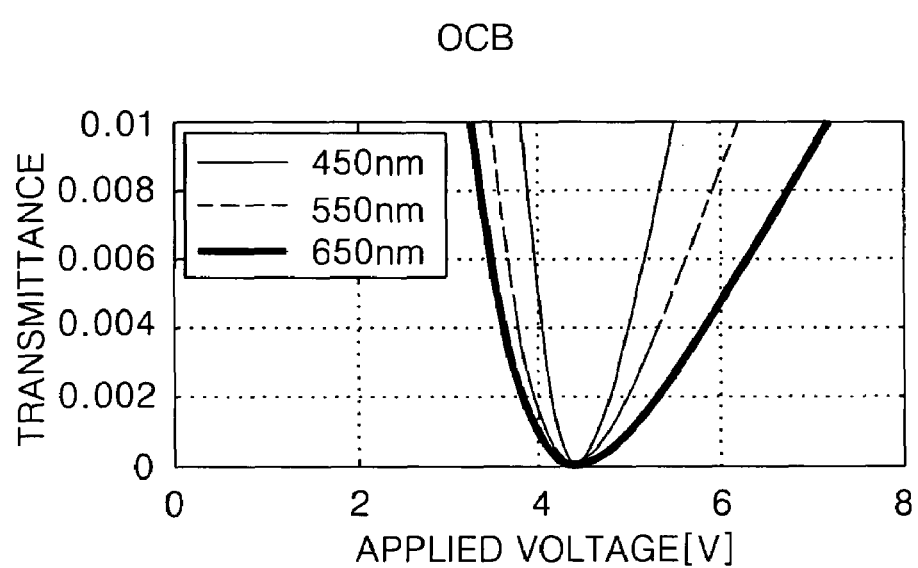
FIG. 7 is a graph showing a relationship of a transmittance T to a driving voltage V for each red, green and blue light in the liquid crystal display according to the first embodiment of the present invention.

When pixel signals RD, GD and BD having a voltage of 5V corresponding to a minimum level brightness are applied to the R, G and B column lines, different common voltages Vcom_r1, Vcom_r2, Vcom_g1, Vcom_g2, Vcom_b1 and Vcom_b2 permit a driving voltage of 5V to be applied to the R liquid crystal cell; a driving voltage of 4.8V to be applied to the G liquid crystal cell; and a driving voltage of 4.5V to be applied to the B liquid crystal cell. The R, G and B liquid crystal cells are supplied with different driving voltages for the minimum brightness, so that it is possible to compensate for a brightness deviation among the R, G and B liquid crystal cells for the same brightness. In other words, when a pixel signal having the same voltage V corresponding to a minimum level brightness is applied to each of the R, G and B liquid crystal cells as shown in FIG. 7, different common voltages $Vcom_{13}r$, Vcom_g and Vcom_b permit a different voltage corresponding to a minimum brightness to be loaded on each R, G and B liquid crystal cell. Accordingly, the R, G and B liquid crystal cells can have the same minimum brightness value. As a result, the liquid crystal display according to the present invention can prevent brightness deviation among the R, G and B liquid crystal cells in correspondence with the same minimum brightness value.

Alternatively, the R and G common voltages Vcom_r and Vcom_g may be set equally and the B common voltage Vcom_b may be set differently to compensate for only the B liquid crystal cell having a larger brightness deviation than the R liquid crystal cell or the G liquid crystal cell.

As described above, according to the present invention, the column lines requiring a brightness deviation compensation of the R, G and B column lines using the common electrode lines divided for each R, G and B column line are subject to compensation using the corresponding common voltage. Thus, it becomes possible to prevent a transmittance deviation among the R, G and B liquid crystal cells corresponding to the same brightness level. Accordingly, the minimum brightness of each R, G and B liquid crystal cell becomes equal to prevent a rise of the black level, so that it is possible to enhance a contrast ratio. As a result, according to the present invention, it is possible to obtain a sharp display of a picture.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   red liquid crystal cell lines having red liquid crystal cells;
   green liquid crystal cell lines having green liquid crystal cells;
   blue liquid crystal cell lines having blue liquid crystal cells; and
   common electrodes for each red, green and blue liquid crystal cell line,
   wherein a common electrode of at least one liquid crystal cell line of the red, green and blue liquid crystal cell lines is supplied with a different common voltage, wherein the common voltage is a reference voltage to drive the liquid crystal cells.

2. The liquid crystal display device according to claim 1, wherein the common electrodes of the red liquid crystal cell lines and the common electrodes of the green liquid crystal cell lines are supplied with a first common voltage and the common electrodes of the blue liquid crystal cell lines are supplied with a second common voltage different from the first common voltage.

3. The liquid crystal display device according to claim 1, wherein each of the red, green and blue liquid crystal cell lines is supplied with a different common voltage.

4. The liquid crystal display device according to claim 3, wherein the common electrodes of the red liquid crystal cell lines are supplied with a red common voltage, the common electrodes of the green liquid crystal cell lines are supplied with a green common voltage different from the red common voltage by a first difference voltage; and the common electrodes of the blue liquid crystal cell lines are supplied with a blue common voltage different from the red common voltage by a second difference voltage.

5. The liquid crystal display device according to claim 4, wherein an absolute value of said first difference voltage is larger than that of an absolute value of the second difference voltage.

6. The liquid crystal display device according to claim 4, wherein any one of said red, green and blue common voltages is a direct current voltage, and a common voltage other than said direct current voltage is an alternating current voltage, wherein polarities of said alternating current voltages are inverted based upon the direct current voltage and polarities of pixel signals applied to corresponding liquid crystal cells.

7. The liquid crystal display device according to claim 4, wherein, when the red, green and blue liquid crystal cells arranged in the horizontal direction are charged with pixel signals having the same polarity, said red common voltage is commonly applied to common electrode lines of the red liquid crystal cell lines, the green common voltage is commonly applied to the common electrode lines of the green liquid crystal cell lines, and the blue common voltage is commonly applied to the common electrode lines of the blue liquid crystal cell lines.

8. The liquid crystal display device according to claim 4, wherein, when the red, green and blue liquid crystal cells arranged in the horizontal direction are charged with pixel signals having a different polarity, the common electrode lines of the red liquid crystal cell lines are divided into at least two groups supplied with first and second red common voltages, the common electrode lines of the green liquid crystal cell lines divided into at least two groups supplied with first and second green common voltages, and the common electrode lines of the blue liquid crystal cell lines are divided into at least two groups supplied with first and second blue common voltages.

9. The liquid crystal display device according to claim 8, wherein said first and second red common voltages have the same absolute value and an opposite polarity, said first and second green common voltages have the same absolute value and an opposite polarity, and the first and second blue common voltages have the same absolute value and an opposite polarity.

10. The liquid crystal display device according to claim 8, wherein first and second common voltages for any two of the red, green and blue colors is the same direct current voltage, and the first and second voltages for a remaining color has the same absolute value and an opposite polarity.

* * * * *